Oct. 2, 1928.

A. B. FIELD

SYSTEM OF CONTROL

Filed Jan. 30, 1923  2 Sheets-Sheet 1

WITNESSES:
R. J. Butler
W. R. Coley

INVENTOR
Allan B. Field.
BY
Wesley G. Carr
ATTORNEY

Oct. 2, 1928.

A. B. FIELD 1,685,948

SYSTEM OF CONTROL

Filed Jan. 30, 1923

2 Sheets-Sheet 2

WITNESSES:
R. J. Butler.
W. R. Coley

INVENTOR
Allan B. Field.
BY
Wesley G. Carr
ATTORNEY

Patented Oct. 2, 1928.

1,685,948

UNITED STATES PATENT OFFICE.

ALLAN BERTRAM FIELD, OF MARPLE, ENGLAND, ASSIGNOR TO WESTINGHOUSE ELECTRIC & MANUFACTURING COMPANY, A CORPORATION OF PENNSYLVANIA.

SYSTEM OF CONTROL.

Application filed January 30, 1923, Serial No. 615,803, and in Great Britain February 1, 1922.

My invention relates to power drives in which two or more polyphase motors receive their power supply from a generating station assigned to them alone or chiefly and comprising two or more polyphase generators; it is particularly applicable to marine propulsion.

In marine propulsion, provision must be made for reversing the direction of rotation of the propeller shaft; but when said shaft is driven by polyphase motors and the usual method of reversal is employed by reversing the connections of two of the phase conductors, the switching apparatus for this purpose is necessarily of heavy construction because the voltages of and currents flowing in these conductors are of a high value. It is, therefore, desirable to provide a method of reversing the direction of rotation of the propelling motor without the necessity for reversing or altering the connections of the phase conductors or changing the direction of rotation of the prime mover.

One object of my invention, therefore, is to provide a reversible drive of the above-indicated character which shall obviate the disadvantages and difficulties of the prior art.

Figure 1:
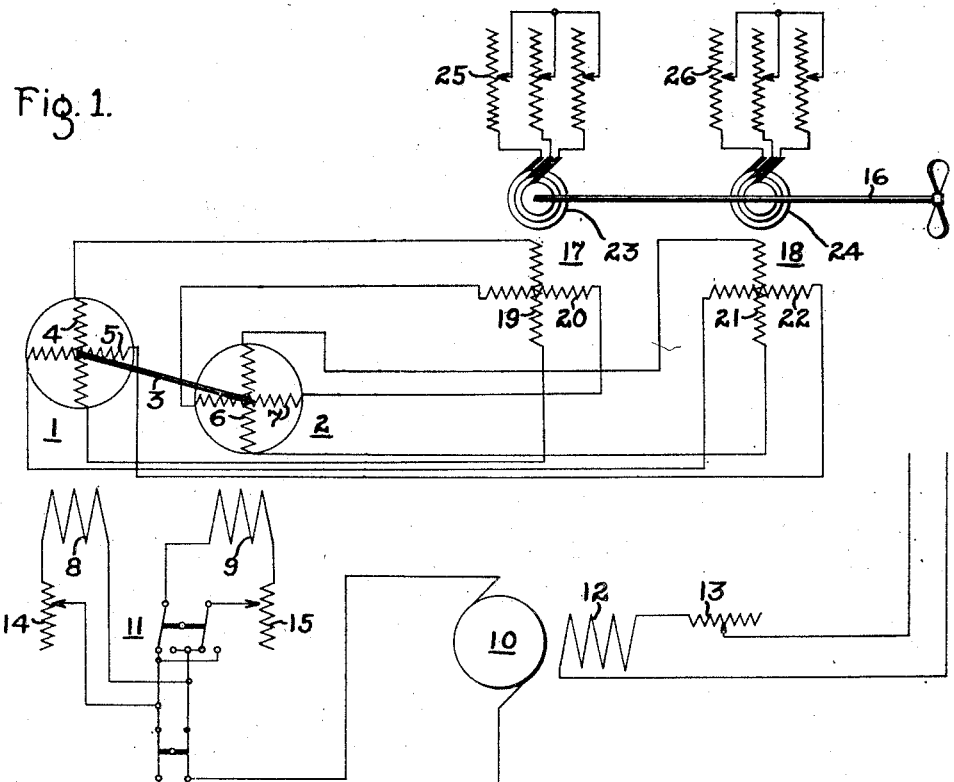

Other objects of my invention will become evident from the following detailed description, taken in conjunction with the accompanying drawing, wherein:

Figure 1 is a diagrammatic view of a system of marine propulsion organized in accordance with my present invention; and Fig. 2 to Fig. 5, inclusive, are similar views, in simplified form, of modifications of my invention.

Referring to Fig. 1, two two-phase generators 1 and 2 are shown as mounted on a single prime mover shaft 3, the phase windings of generator 1 being indicated at 4 and 5 and those of the generator 2 at 6 and 7, respectively. The field windings of the generators are indicated at 8 and 9, being supplied with direct current from an exciter 10, one of said field windings 9 being connected through a reversing switch 11. The exciter is provided with a field winding 12, having an adjustable resistor 13 included in series relation therewith and supplied with direct-current energy from any suitable source. The field windings 8 and 9 have series resistors 14 and 15, whereby the voltages of the generators 1 and 2 may be equalized, while the excitation of the two generators may be controlled simultaneously by means of the variable resistor 13.

The single propeller shaft 16 is provided with two motors 17 and 18 having stator windings 19, 20 and 21, 22, respectively. The rotors of the two motors are indicated at 23, 24 as being of the three-phase type and connected through slip rings to starting resistors 25, 26. It will be observed that the phase winding 19 of rotor 17 is connected to phase winding 4 of generator 1, while the phase winding 20 of said motor is connected to the phase winding 7 of the second generator 2. The phase winding 21 of motor 18 is connected to phase winding 6 of generator 2, while phase winding 22 of this motor is connected to phase winding 5 of generator 1.

In order to reverse the direction of rotation of the propeller shaft, the excitation of generators 1 and 2 may be reduced by means of the resistor 13 and the field winding 9 of generator 2 reversed through the reversing switch 11, after which the excitation of both generators is increased to normal. The motor starting resistors 25 and 26 may of course be suitably manipulated during this process.

The two motors 17 and 18 may be mounted on separate propeller shafts but in that case both propeller shafts will be simultaneously reversed and they cannot be individually reversed except by changing the stator connections of the motors.

Figure 2:
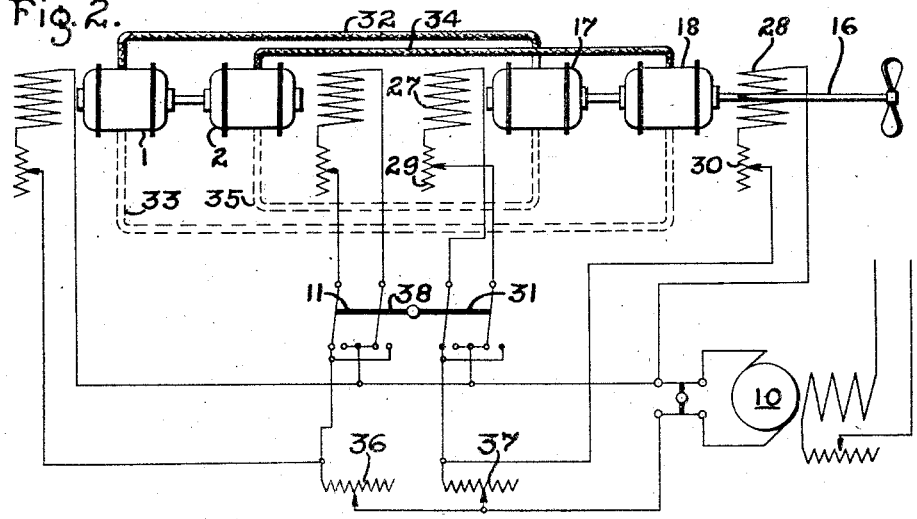

In Fig. 2 a similar diagram is shown, the motors 17 and 18 being in this case of the alternating-current synchronous type with field windings 27, 28 and rheostats 29, 30 supplied with direct-current from the exciter 10, the field winding 27 being connected through a reversing switch 31. The phase conductors are for the sake of simplicity shown as single lines, the conductors for phases Nos. 1 and 2 of generator No. 1 being indicated at 32 and 33, respectively, while corresponding phase conductors of generator No. 2 are indicated at 34 and 35. Rheostats 36 and 37 are furthermore provided for independently varying the current supplied to the generators and motors, respectively. The reversing switches 11 and 31 are shown as being connected by the bar 38 so as to be simultaneously operated.

For reversing the direction of the propeller shaft 16, the field winding of generator 2 may be reversed as described with reference to Fig. 1, and simultaneously the field winding motor 17 is also reversed by the operation of the reversing switch 31. Obviously either generator field winding and either motor field winding may be reversed to obtain reversal of the propeller shaft. The reversal of the motor field winding becomes necessary because the phase relationship of the voltage produced in the synchronous motors is fixed by reason of the two motors being on a single shaft. After reversal of one generator field winding, therefore, anl reversal of the propeller shaft, either the one or the other motor will have the sign of its voltages and their phase location correct for the supply conditions but the other motor, while having its direction of phase rotation correct, will be generating voltages in the wrong direction in each phase, unless its field winding is reversed.

The synchronous motors may be motors with phase-wound rotors, which operate as synchronous motors after coming up to speed by the application of direct-current to the rotor, or they may be any other known type of synchronously running rotor suitable for the purpose and dealt with in accordance with the requirements during the process of reversal.

Figure 3:
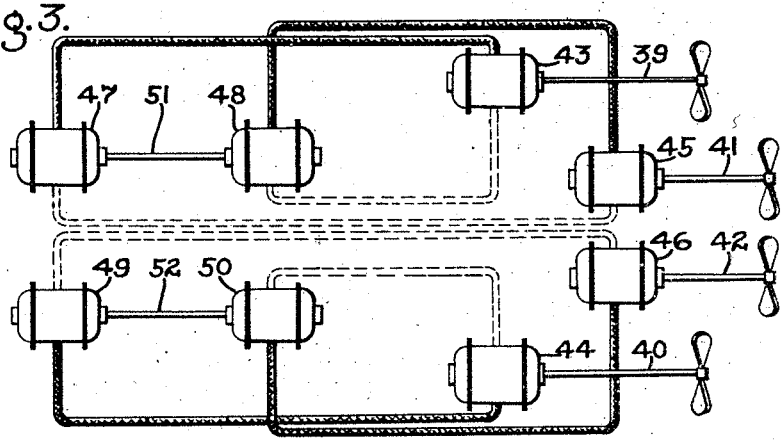

Referring now to Fig. 3, an arrangement is shown in which four propeller shafts 39, 40, 41, 42 are each rotated by a single two-phase motor, the motors being indicated at 43 to 46, respectively. Four generators, indicated at 47 to 50, respectively, are arranged to be driven from two prime mover shafts 51 and 52. The generators 47 and 48 supply power for the motors 43 and 45, which drive the star-board propellers, while the generators 49 and 50 supply power for the motors 44 and 46, which drive the port propellers. To reverse the two port propellers, one of the generators 49 or 50 has its field winding reversed and similarly the star-board propellers may be reversed by reversing the field winding of one of the motors 47 or 48. In this case, as the motors are all on separate shafts, it is unnecessary to reverse the motor field winding if synchronous motors are used, as the two associated propeller shafts may take up positions shifted relatively by one pole pitch on reversal.

Alternatively, the four motors shown in Fig. 3 may be mounted on two propeller shafts, two on each and, whether arranged in this way or as shown in Fig. 3, the four generators may if desired be driven by a single prime mover shaft instead of by two as shown in the figure.

Figure 4:
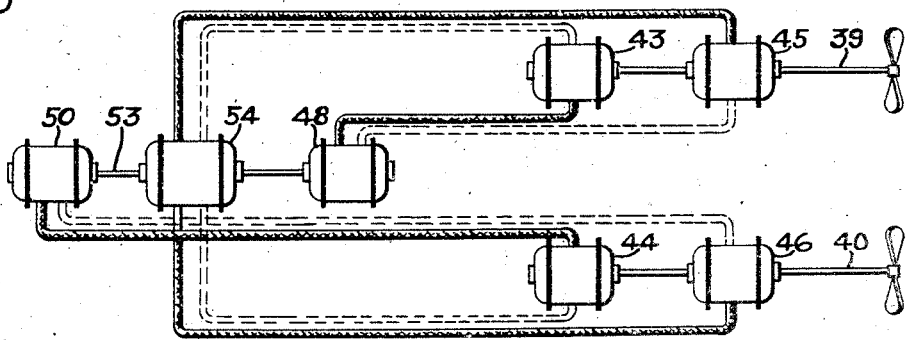

The diagram, Fig. 4, illustrates an arrangement of this kind, the star-board motors 43 and 45 driving a single starboard propeller shaft 39, while the port motors 44 and 46 drive a single port propeller shaft 40. The motors are supplied with energy from generators driven by a single propeller shaft 53 and, as it is only necessary to reverse one generator of each pair, the generators 47 and 49 are shown as being combined into a single generator 54 of higher output. In this scheme it is obvious that by reversing the generator 48, the star-board propeller shaft 39 is reversed, and by reversal of the generator 50, the port propeller shaft 40 is reversed. If the motors are synchronous motors, then the field winding of one of the motors on each shaft must be reversed when reversal of the corresponding propeller shaft is effected.

Figure 5:
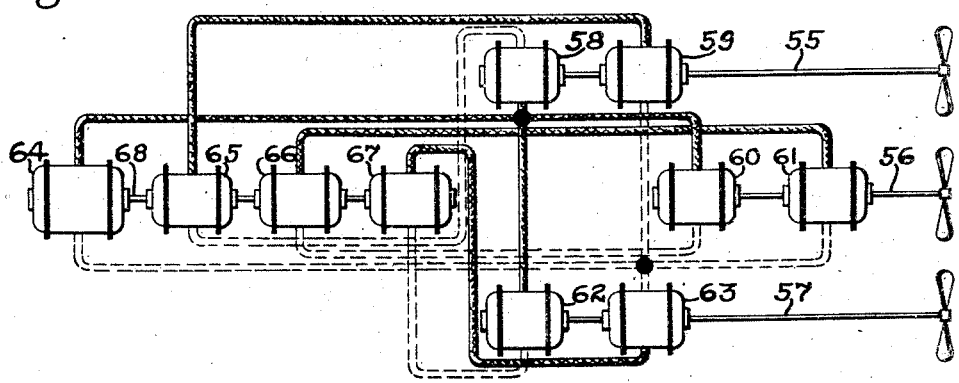

Another arrangement is illustrated in Fig. 5 wherein three propeller shafts 55, 56, 57 are each rotated by a pair of motors 58 and 59, 60 and 61, and 62 and 63, respectively. The motors are supplied with energy from four generators 64 to 67, driven by a single prime mover shaft 68. The generator 65 supplies one phase of the motors 58, 59, generator 66 supplies one phase of the motors 60, 61, and generator 67 supplies one phase of the motors 62, 63. The generator 64 supplies the other phase of all the motors, consequently the output of this last generator corresponds to the power required by three motors while the output of each of the generators 65, 66, 67 corresponds to the power of one motor.

It will be readily understood that by reversing the field winding of generator 64, all three propeller shafts are simultaneously reversed, while any one propeller shaft may be individually reversed by reversing the field winding of the corresponding generator 65, 66 or 67. If the motors are of the synchronous type the field winding of one of the motors on a shaft which is being reversed, must be simultaneously reversed with the reversal of its corresponding generator field winding.

According to the present invention, therefore, I provide a method of reversal which does not require changing the connection of the main phase conductors. This result is attained by providing in connection with each drive that is to be subject to reversal, two two-phase electric motors, said motors being supplied with energy from two two-phase generators which are connected to the motors as follows, namely, phase No. 1 of one of the motors is supplied from one of the generators, and phase No. 2 of said motor is supplied from the other generator; on the other hand the second motor has phase No. 1 supplied from the second generator and phase No. 2 supplied from the first generator. If the generators are similar and of the same capacity and if the motors are similar and of the same capacity it will be seen that, assuming the load is divided equally between the motors, each generator will be equally loaded with balanced loads on its two phases and will therefore operate with good efficiency. In order to reverse the direction of rotation of the motors, it will only be necessary to reverse the excitation of one of the generators if induction motors are used or if synchronous motors on separate shafts are used, for instance, on two out of four propeller shafts; if synchronous motors are used, arranged two on one propeller shaft, then it is necessary to reverse the field winding of one of the synchronous motors as well as of one of the generators. By this means one phase will be reversed in the power supply to each motor and, consequently, the motors will rotate in the reverse direction. Preferably, in order to avoid unsymmetrical loads, it will be desirable, when reversing, to reduce the excitation of each generator to zero and then after reversing the excitation of one of the generators to increase the exciting field of both generators to the maximum. The motor field windings, in the case of synchronous motors, may be similarly dealt with.

The two generators involved in one drive are preferably mechanically coupled together and driven by the same prime mover. A fixed phase relationship between them is required on account of their parallel operation through the medium of the motors which they jointly supply, and to ensure a predetermined direction of rotation of the motors at starting.

The invention may be applied in connection with a plurality of propeller shafts, each shaft being driven by one or by two-phase motors, all the motors being connected to a single pair of two-phase generators if desired. In such case, reversal of the field excitation of one of the generators, together with a suitable handling of the field windings of the motors, if of the synchronous type, will cause a simultaneous reversal of all the propeller shafts. If, however, this result is not desired, but the propeller shafts are to be subject to reversal in say two groups, then two independent generator groups will be provided one for each shaft group and each generator group will comprise at least two two-phase generators. Since, however, the direction of rotation of the generators is not changed, these may all be rotated by a single prime mover if desired.

If only two generators per group are used these should both be synchronous machines.

The motors may be of the induction type, the synchronous type, or the synchronous induction type and there may be one, two or more per shaft.

It will be understood that the invention is not limited to the arrangements illustrated in the drawings as these are given merely by way of example and other combinations of motors and generators which fall within the scope of the invention may readily be designed by persons skilled in the art. I desire, therefore, that only such limitations shall be imposed as are indicated in the accompanying claims.

I claim as my invention:

1. A system of control comprising two mechanically connected two-phase synchronous motors and two two-phase generators for supplying energy thereto, one motor having its first phase winding connected to the one generator and its second phase winding connected to the second generator, while the second motor has its first phase winding connected to the second generator and its second phase winding connected to the first generator, and means for simultaneously reversing the excitation of one of said motors and one of said generators.

2. A system of control comprising two mechanically connected two-phase synchronous motors and two two-phase generators for supplying energy thereto, one motor having its first phase winding connected to the one generator and its second phase winding connected to the second generator, while the second motor has its first phase winding connected to the second generator and its second phase winding connected to the first generator, and means for simultaneously reversing the excitation of either generator and of one of said motors to effect a reversed rotation of both motors.

3. A system of control comprising a plurality of two-phase generators, a purality of synchronous motors each having its phase windings connected to the respective windings of the several generators, and means for simultaneously reversing the excitation of one motor and one of said generators.

4. A system of control comprising a plurality of two-phase generators, a plurality of synchronous motors adapted to drive a common load and severally having their phase windings mutually cross-connected to the phase windings of the respective generators and means for reversing the excitation of one of said motors when the direction of operation of said load is to be reversed.

5. A system of control comprising a plurality of two-phase generators, a plurality of synchronous motors adapted to drive a common load and severally having their phase windings mutually cross-connected to the phase windings of the respective generators and means for reversing the excitation of one of said motors when the direction of operation of said load is to be reversed, and means for simultaneously reversing the excitation of one of said motors and one of said generators.

In testimony whereof, I have hereunto subscribed my name this 9th day of January 1923.

ALLAN BERTRAM FIELD.